Feb. 10, 1953 G. WELBORN 2,627,781
STEREOSCOPIC VIEWER
Filed June 9, 1951
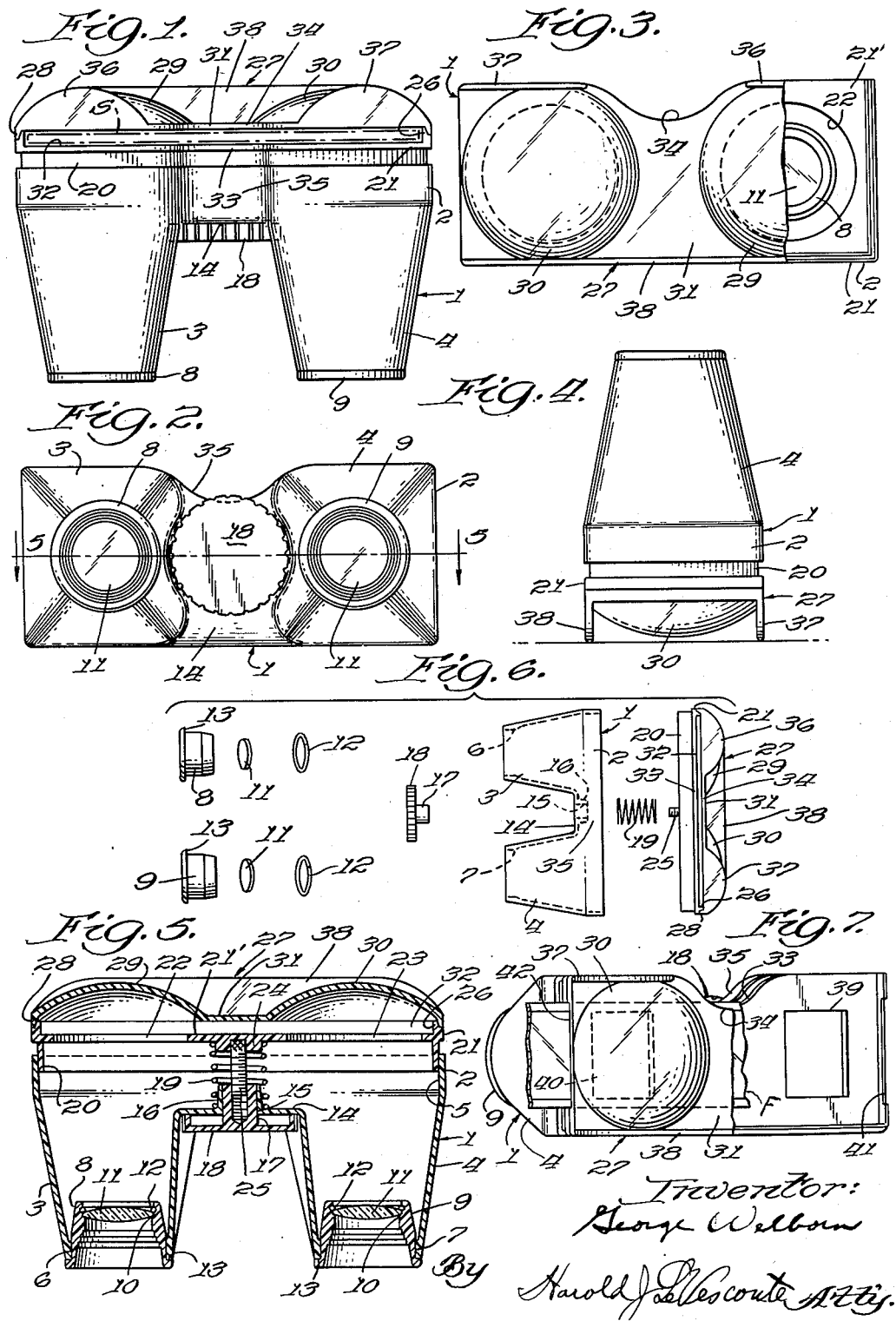

Patented Feb. 10, 1953

2,627,781

UNITED STATES PATENT OFFICE 2,627,781

STEREOSCOPIC VIEWER

George Welborn, Los Angeles, Calif.

Application June 9, 1951, Serial No. 230,824

3 Claims. (Cl. 88—29)

This invention relates to stereoscopic viewers for transparent film slides and film strips of the type adapted for use in stereoscopic viewers and particularly to an improved form thereof characterized by simple design adapted for economical manufacture and for improved light transmission for uniform lighting of the viewing area.

An object of the invention is to provide a viewer for stereoscopic transparent objects which is simple in design, is composed of few parts and which is susceptible of economical manufacture.

Another object of the invention is to provide a stereoscopic viewer which is readily taken apart for cleaning interior surfaces.

Another object of the invention is to provide a stereoscopic viewer of simple design having a means for focal adjustment, which means is also the means for disassembling and assembling the component parts incident to cleaning the interior surfaces.

A further object of the invention is to provide a stereoscopic viewer for transparencies adapted to use daylight or other external light which includes means for collecting and uniformly diffusing the light to be transmitted through the transparency to be viewed.

With the foregoing objects in view, together with such other objects and advantages as may subsequently appear, the invention resides in the parts, and in the construction, combination and arrangement of parts described, by way of example, in the following specification of certain modes of execution of the invention and illustrated in the accompanying drawings which form a part of said specification and in which drawings:

Fig. 1 is a top elevation of a viewer embodying the invention,

Fig. 2 is an elevation of the viewing end of the viewer shown in Fig. 1,

Fig. 3 is an elevation of the opposite end of the viewer, portions thereof being broken away for clearness of illustration, Fig. 4 is a side elevation showing the viewer placed on a supporting surface and showing the means by which the light collecting and diffusing means is protected against scratching or other damage, Fig. 5 is a medial, transverse sectional view taken on the line 5—5 of Fig. 2, Fig. 6 is an exploded view showing the component parts of the viewer, and Fig. 7 is a slightly perspective end elevation showing the modification thereof to adapt the viewer for use with film strips.

Referring to the drawings, the illustrated embodiment of the invention includes a body component 1 formed of a hollow plastic molding and includes a generally rectangular base portion 2 open at one side thereof and having a pair of frusto-conical lens supporting members 3 and 4 projecting from the side opposite the rectangular opening 5; said members terminating in circular openings 6 and 7, respectively, in which cylindrical combined eyepiece and lens mounts 8 and 9 are frictionally engaged. Preferably, the inner surfaces of the members 3 and 4 are roughened as by sand blasting to reduce glare from light admitted through the eyepieces. Each lens mount at its proximal side is provided with a series of light diffusing shoulder portions of progressively decreasing diameter and the smallest of these diameters forms a shoulder 10 against the opposite side of which a lens element 11 is mounted and held in position by a snap ring 12. Preferably, both the lens mounts and the lenses are formed of plastic moldings. Each lens mount at its proximal end is provided with an external flange forming a shoulder 13 adapted to engage the end of the members 3 and 4 to correctly position the lens held thereby relative to the body component at a focal distance which is within the range of adjustment provided by means to be hereinafter described. Since the lens mounts are only frictionally held in the members 3 and 4, they are readily removed to clean the inner faces of the lenses.

The adjacent sides of the members 3 and 4 are connected by an end wall member 14 having an opening 15 extending therethrough at the center; said opening being surrounded by a sleeve 16 extending from the inner face of the wall 14 in the direction of the rectangular opening 5 and serving as a bearing for the shank 17 of an adjusting and connecting nut element 18 and externally as a locating means for one end of a compression spring 19 hereinafter to be referred to in more detail.

Slidingly engaging the inner periphery of the rectangular opening 5 is the flange 20 of a masking element 21 of the transparency holding component of the viewer comprising a wall 21' extending across the opening 5 and having openings 22 and 23 therein disposed in alignment with the viewing fields of the lens elements 11. Disposed in the center of the wall 21' on the side thereof toward the body component is a boss 24 in which a threaded stud 25 is mounted and located in axial alignment with the nut element 18 (see Fig. 5). The outer periphery of the boss serves to locate the other end of the spring 19 and the spring is normally compressed between the opposed faces of the walls 14 and 21' tending to force them away from each other to the extent permitted by the extent of interengagement of the nut 18 with the stud 25. Thus as the nut is screwed on to the stud the transparency holding component will be moved toward the body component and as the nut is screwed off the stud the spring 19 will move the components away from each other with resultant focal adjustment. Additionally, when the stud and nut are disengaged, the components may be taken apart to clean the interior surfaces of the viewer.

The masking element wall 21' is further provided with a rearwardly extending flange portion 26 which extends along the bottom and both side edges thereof. The outer face of the flange 26 is tapered and serves as a mounting means for a translucent light admitting, collecting and diffusing element 27 having a mating flange portion 28 adapted to be connected to the flange 26 by cementing or other suitable means. The element 27 includes a pair of thin walled exteriorly convex portions 29 and 30 disposed in alignment with the optical axes of the lenses and due to their configuration, these convex portions will collect light from an area of greater diameter than the portions and will transmit that light to the interior of the viewer on the side of the transparency to be viewed which is opposite the lenses. The focal point of the portions 29 and 30 is located considerably beyond the transparency so that the illumination is diffused uniformly over the viewing area, while the translucent character of the element 27 provides a light background for the transparency. The combined masking and light transmitting elements form the transparency holding component of the invention and the space between the rear face of the wall 21' and the wall 31 between the elements 29 and 30 forms a slot or recess 32 into which stereoscopic slides S may be inserted for viewing; the omission of the flanges 26 and 28 from the top face of the members of the transparency holding component providing the opening for the recess 32. The top surfaces of the transparency holding component and the top edge of the wall 14 of the body component at the center thereof are provided with depressions 33, 34 and 35 to provide clearance for grasping and removing slides from the recess 32. Additionally, the light admitting element 27 at the top and bottom edges of its outer face is provided with ledges 36, 37 and 38 which project beyond the convex portions 29 and 30 to provide leg portions upon which the viewer may be set on end (see Fig. 4) upon a table or the like without danger of damaging the surfaces of the convex portions 29 and 30.

Referring now to the form of the invention shown in Fig. 7, all similar parts have been indicated with the numbers heretofore applied. The modified form of the invention is intended for viewing continuous strips of film F rather than individual slides which strips are arranged with stereoscopically arranged pairs of pictures. For such use, the masking openings are preferably rectangular as indicated at 39 and 40 and portions of the side portions of the flanges 26 and 28 are cut away to form slots 41 and 42 through which the film strip may be passed across the field of vision.

All of the parts with the exception of the stud 25 and spring 19 may be formed of plastic moldings and each such part is so designed as to be susceptible of economical molding. The interior of the viewer may be readily cleaned by unscrewing the nut 18 from the stud 25 and removing the masking element from the body element. The focal distance may be readily adjusted to suit individual users by the stud and nut means which holds the main component parts in assembly and the lenses may be removed for cleaning without dismounting the rest of the device. Other advantages will be apparent to those skilled in the art.

While in the foregoing specification I have disclosed certain embodiments of my invention, I do not limit myself to the exact forms so described and illustrated, and the invention includes all such modifications in the parts and in the construction, combination and arrangement of parts as shall come within the purview of the appended claims.

I claim:

1. A viewer for stereoscopic transparencies comprising a hollow body component formed of opaque material; said body component including side walls defining a substantially rectangular open side, an end wall opposite said open side and a pair of substantially frusto-conical lens supporting elements projecting from said end wall in a direction from said open side, a pair of lenses mounted one in each of said lens holding elements at the distal end thereof, a transparency holding component including means forming a recess adapted to receive and position a transparency for viewing, a flange portion slidably engaging the side walls of said body component and a means for admitting light from a source located exteriorly of the viewer and diffusing admitted light uniformly over the viewed areas of the transparency on the side thereof opposite said lenses; said light admitting and diffusing means comprising a translucent element fixed to the side of said transparency holding component at the side thereof remote from said lenses and spaced from said holding component to form a transparency receiving recess and having a pair of exteriorly convex portions disposed one each substantially concentrically with respect to the optical axes of said lenses; said convex portions being effective to collect exterior light from a wide angle and to concentrate the collected light on the areas of a transparency disposed in said recess and observable through said lenses, and means for adjusting said transparency holding component toward and away from said body component for focal adjustment; said adjusting means comprising a threaded stud carried by one of said components, a manually operable nut element threadedly engaging the threads on said stud carried by the other of said components, and a spring reacting between spaced parallel wall portions of said components and operative constantly to urge said components away from each other to the extent permitted by the engagement between said stud and said nut element.

2. A viewer for stereoscopic transparencies comprising a hollow body component formed of opaque material; said body component including side walls defining a substantially rectangular open side, an end wall opposite said open side and a pair of substantially frusto-conical lens supporting elements projecting from said end wall in a direction from said open side, a pair of lenses mounted one in each of said lens holding elements at the distal end thereof, a transparency holding component including means forming a recess adapted to receive and position a transparency for viewing, a flange portion slidably engaging the side walls of said body component and a means for admitting light from a source located exteriorly of the viewer and diffusing admitted light uniformly over the viewed areas of the transparency on the side thereof opposite said lenses; said light admitting and diffusing means comprising a translucent element fixed to the side of said transparency holding component at the side thereof remote from said lenses and spaced from said holding component to form a transparency receiving recess and having a pair of exteriorly convex portions disposed one each substantially concentrically with respect to the optical axes of said lenses; said convex portions being effective to collect exterior light from a wide angle and to concentrate the collected light on the areas of a transparency disposed in said recess and observable through said lenses, and means for detachably interconnecting said components comprising a stud carried by one of said components, a manually operable nut element carried by the other of said components and engageable with said stud; said interconnecting means also serving as adjusting means for decreasing the distance between said lenses and a transparency mounted in said recess, and a spring positioned between parallel wall portions of said components effective constantly to urge said components away from each other to the extent permitted by the position of said nut element on said stud.

3. A viewer for stereoscopic transparencies comprising a hollow body component formed of opaque material; said body component including side walls defining a substantially rectangular open side, an end wall opposite said open side and a pair of substantially frusto-conical lens supporting elements projecting from said end wall in a direction from said open side, a pair of lenses mounted one in each of said lens holding elements at the distal end thereof, a transparency holding component including means forming a recess adapted to receive and position a transparency for viewing, a flange portion slidably engaging the side walls of said body component and a means for admitting light from a source located exteriorly of the viewer and diffusing admitted light uniformly over the viewed areas of the transparency on the side thereof opposite said lenses; said light admitting and diffusing means comprising a translucent element fixed to the side of said transparency holding component at the side thereof remote from said lenses and spaced from said holding component to form a transparency receiving recess and having a pair of exteriorly convex portions disposed one each substantially concentrically with respect to the optical axes of said lenses; said convex portions being effective to collect exterior light from a wide angle and to concentrate the collected light on the areas of a transparency disposed in said recess and observable through said lenses; said translucent element including a plurality of outwardly projecting flange portions extending beyond said convex portions and effective to act as legs when the viewer is placed on a surface with said translucent element down to protect the surfaces of said convex portions against damage, and means for adjusting said transparency holding component toward and away from said body component for focal adjustment; said adjusting means comprising a threaded stud carried by one of said components, a manually operable nut element threadedly engaging the threads on said stud carried by the other of said components, and a spring reacting between spaced parallel wall portions of said components and operative constantly to urge said components away from each other to the extent permitted by the engagement between said stud and said nut element.

GEORGE WELBORN.

REFERENCES CITED

The following references are of record in the file of this patent:

UNITED STATES PATENTS

| Number | Name | Date |
|---|---|---|
| 756,881 | Nehring | Apr. 12, 1904 |
| 2,003,480 | De Vry | June 4, 1935 |
| 2,336,288 | Peterson | Dec. 7, 1943 |
| 2,543,113 | Leavitt | Feb. 27, 1951 |